July 21, 1964
L. U. CHUANICO
3,141,568
COOKING UTENSIL COVER
Filed Sept. 16, 1963
2 Sheets-Sheet 2
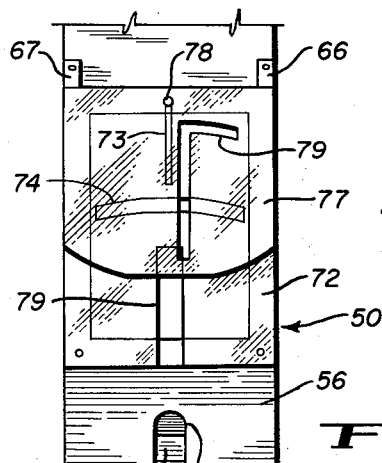
Fig_6
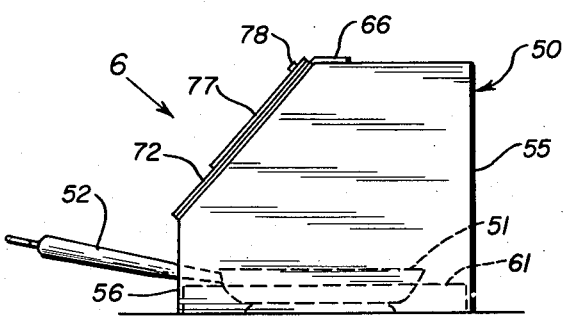
Fig_5
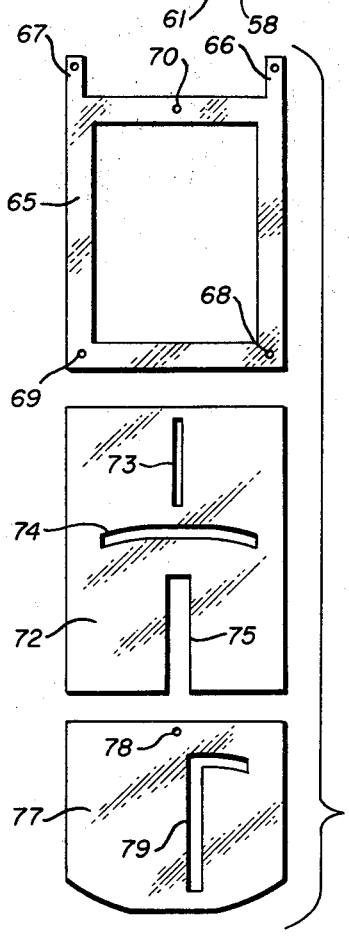
Fig_7
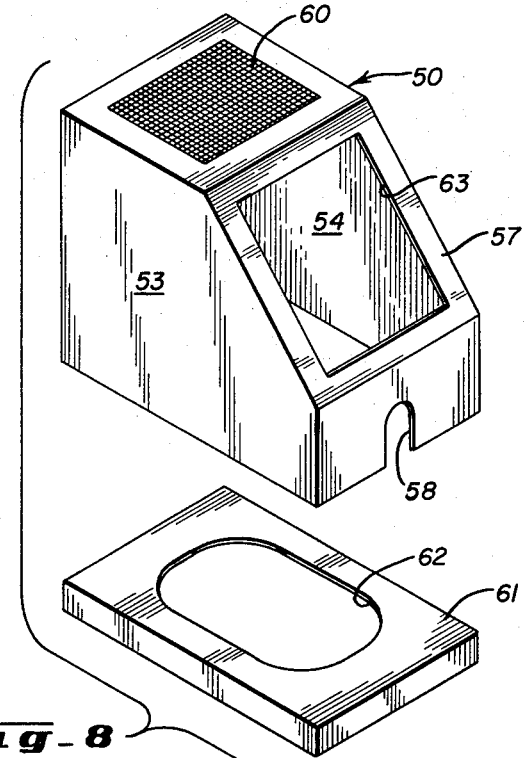
Fig_8
INVENTOR.
Lino Uy Chuanico
BY
ATTORNEYS

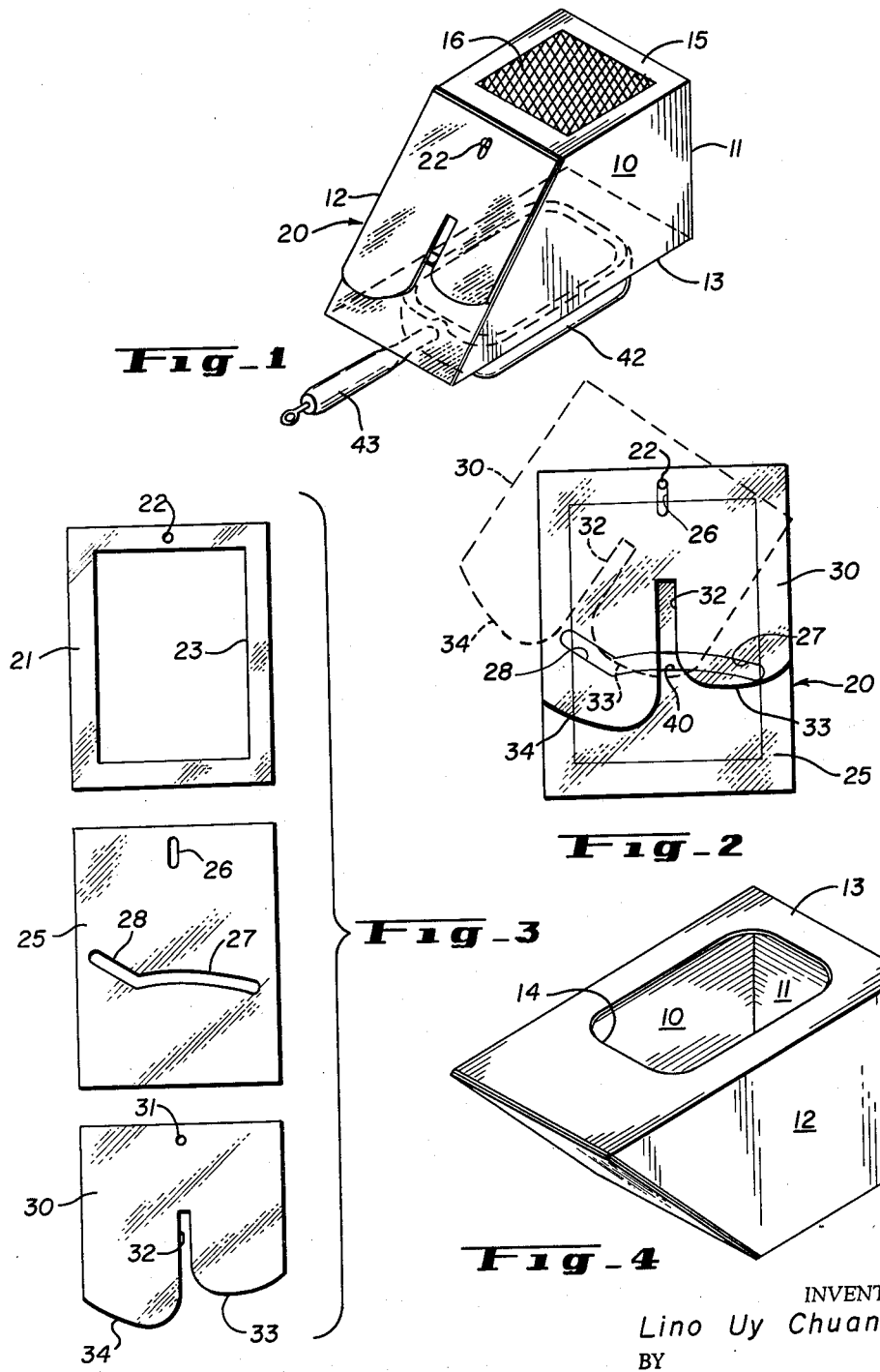

United States Patent Office 3,141,568
Patented July 21, 1964

3,141,568
COOKING UTENSIL COVER
Lino U. Chuanico, 2333 13th St., Apt. 4, Boulder, Colo.
Filed Sept. 16, 1963, Ser. No. 309,189
4 Claims. (Cl. 220—44)

This invention relates to cooking utensil covers and more particularly to cooking utensil covers which are arranged to provide both means for visually inspecting the cooking food and means for stirring the cooking food while the utensil remains completely covered.

Pan covers, splash hoods, filters and the like have been proposed in various forms for cooking utensils of all sorts. Many such devices are in and have been in use for substantial periods of time. In most instances any of these devices provide a certain amount of covering for the pan; however, the cover or hood must be removed for tending the food cooking in the pan. Additionally, most of the covers do not provide means for viewing the contents in the pan during cooking without lifting the cover, except glass covers which must be removed for tending the food. A major object of the invention, therefore, is to provide a cover for a cooking pan or utensil which provides means for tending the food during the cooking without removal of the cover.

Another object of the invention is to provide a cover which completely encloses a cooking pan and provides means for tending cooking food without removal of the cover.

Another object of the invention is to provide a cover which permits means for the entrance and removal of a cooking utensil into cooking food without removal of the cover from a cooking pan.

A still further object of the invention is to provide a cover for a cooking pan which permits observation of the cooking food, filtering of the smoke and odors resulting from the cooking, and provides a splash hood for the food to prevent spattering the cooking stove.

These and other objects and advantages of the invention may be readily ascertained by referring to the following description and appended illustrations in which:

FIG. 1 is a schematic view of one form of the invention mounted in operative position on a cooking pan;

FIG. 2 is a front elevational view of a portion of the pan cover illustrating the operation of the viewing portion of the cooking pan cover;

FIG. 3 is an exploded view of the front cover assembly of the device of FIG. 1;

FIG. 4 is a bottom perspective view of the cooking pan cover of FIG. 1 showing a cover for one particular type of cooking pan;

FIG. 5 is a side elevational view of a modified cover according to the invention;

FIG. 6 is an oblique, front elevational view from the dart 6 of FIG. 5, showing the viewing cover in full;

FIG. 7 is an exploded view of the components of the viewing cover of FIG. 5; and FIG. 8 is an exploded view of the cover shell of FIG. 5.

One form of the invention is illustrated in FIGS. 1–4, wherein a generally rectangular box having a sloped front is arranged for mounting on a generally rectangular frying pan. The shape of the cover is generally immaterial to the invention; however, the front portion must be planar to provide operation of the components thereof for the function as specified below. Thus, an enclosure having a planar front on a round resting portion may be used for round frying pans and the like. Additionally, the shape may be made to cover oblong or elliptical frying pans and still provide the advantages of the invention.

In the device illustrated for purposes of the present application, a generally rectangular enclosure comprised of sides 10, back side 11, and opposite side 12 is provided with a bottom 13 having an opening 14 arranged to fit over a particular shape of frying pan. The opening, of course, may be made in any shape depending on the shape of the pan. In some instances the cover may be made to sit on the top of the frying pan shown in FIG. 1, or it may be made to sit down over the pan and completely enclose the pan within the box. The choice depends on the particular pan and use.

The box is provided with a top cover 15 having a filter unit 16 secured therein. The filter unit 16 may be removable for cleaning as is common in vent hoods, or it may be disposable. A front cover assembly, shown generally by numeral 20, is provided on the assembly completing the device.

The front cover assembly includes a frame 21 having a pin 22 affixed at the top side thereof, and provided with a rectangular open center portion 23. The frame 21 may be of clear plastic, fire glass, or metal, or the like, and it may be affixed in any convenient manner to the sides 10 and 12 and the top member 15. Where the members 10 and 12 are made of light gauge metal the edges may be turned outwardly and the frame attached thereto by adhesives, screws or the like. The next member of the assembly is a transparent plate 25 having a vertically oriented slot 26 arranged to fit over the pin 22. The plate has a double slot generally centrally thereof, which includes an arcuate slot portion 27 extending a substantial distance across the face of the plate in a general horizontal orientation and a biased, generally straight, slot extension 28 extending from one end of the slot upwardly toward an upper portion of the plate. The outside cover portion includes a plate 30 having a central slit 32 extending approximately halfway through the longitudinal extent of the plate and an opening 31 extending therethrough at the top of the plate. One side of the plate at the side of the slit includes a shortened extension 33 having a rounded end, and the opposite side includes a longer extension 34, also having a rounded end. The plate 30 is made of transparent material and is arranged to be superimposed over the plate 25 and mounted on the pin 22. The transparency of the two overlaid members must be such that a cook can see through both of them.

In one form of the device the frame member 21 is affixed to the cover box assembly which includes the sides, back, top and bottom, and the plates 25 and 30 are pivotally retained on the peg 22 for movement as explained. By having the plates removable the entire device is easily taken apart, cleaned and reassembled for use. The cover is placed on a cooking pan as shown in FIG. 1, the normal pan 42 having a handle 43 which extends beyond the cover for manipulation of the pan. The plate 25 is then placed on the peg 22 and the plate 30 is, likewise, placed on the peg 22 over plate 25 so that both freely pivot on the pin 22. With the plates 25 and 30 in position, it is seen that a small opening 40 is provided jointly by the groove 27 and the slot 32. By moving the plate 30 far to the left as indicated in the dash lines (FIG. 2) the slot portion 28 is exposed beneath the shortened section 33 so that a spatula may be slipped in the upwardly sloped slot portion 28. After the spatula head is passed inside the unit, its handle may be moved down into the slot 27 which permits the plate 30 to pivot on the pin 22 into the position shown in FIG. 2. The elongated slot 26 permits the plate 25 to be moved upwardly and downwardly as well as pivotally by the spatula shank during movement in tending the food in the pan. The plate 30 pivots as the spatula is moved sidewise, thus a generally universal action is provided for the spatula within a relatively large area. This permits the movement of the spatula to cover all areas of the cooking utensil.

With a spatula in the slots and with the two covers in place, it is readily seen that sideways movement of the spatula handle in the slot 27 pivots the plate 30 about the peg 22. Any vertical movement of the spatula in slot 32 moves the plate 25 in the elongated slot 26 on the peg 22, thus providing a two-directional movement for the opening 40 through which the handle of the spatula extends. If it is desired to withdraw the spatula, it is moved to the left along the slot 27 so that the handle passes into the slot 28 which moves the plate 30 to the position indicated in dash lines exposing the slot 28 where the spatula may be withdrawn. The progress of the cooking material may be followed by visual observation through the transparent covers. Any splashing, smoke or fumes will be contained internally of the cover or caught in the filter 16. A cooking spatula or utensil may be easily entered into the hood or withdrawn as explained above.

In the device shown in FIGS. 5 through 8, a slightly modified cover is shown. In this case, a rectangular box-like cover is shown in general by the numeral 50 is arranged to cover a cooking utensil 51 with its handle 52 extending outwardly beyond the cover. The box or shell includes sides 53 and 54 and a rear wall 55. The front includes a sloped upper section 57 and a lower section 56 which has an opening 58 for the utensil handle. In a manner similar to that of FIG. 1, a filter 60 is provided in the top forming a complete closure. A bottom member 61 is arranged to fit internally in the box and it is provided with an opening 62 in the shape of a pan desired so that the pan fits in the opening. With the pan and the insert 61 in place the device completely encloses the cooking utensil therein. The insert 61 is preferably separable, but may be secured to the cover where desired.

An opening 63 in front member 57 is arranged to be closed by a series of movable elements which are shown in FIG. 7 separately and in superimposed relation in FIG. 6. The opening 63 is initially encircled by a frame 65 having tabs 66 and 67 at the top which are arranged to be bent back over and secured to the cover. Holes 68 and 69 are arranged to apply screws or other fastening devices for securing the frame to the cover. A pin 70 is provided at the upper part of the frame for supporting the two movable overlays. The first overlay 72 has an upper slot 73, an intermediate arcuate slot 74 and a lower slot 75. The slot 73 is arranged to pass over the pin 70 and permit the movement of the overlay 72 in a vertical movement. For this purpose, the edges of the frame 65 may be turned up so that the overlay 72 will only move up and down and not pivot about the pin on the slot 73. The top overlay 77 is provided with a hole 78 which is arranged to pass over the pin 70 to permit pivotal movement of the overlay. Member 77 has an upside down L-shaped slot 79 positioned for the cooperation with the slot 74 for a spatula handle as explained for the device of FIG. 1.

The slots are registerable so that a spatula head may be extended through the slots with its handle in the opening formed by the two slots. Then by the movement of the various overlay members, the spatula may be moved around to stir the food while cooking. In the case of the form of FIGS. 5–8, the overlay 72 is moved upwardly so that the slot 74 mates with the upper part of slot 79 and the spatula head may then be extended into the interior of the cover. By the pivotal movement of the overlay 77 and the upward and downward movement of the overlay 72 the opening moves around and the spatula may be moved to any part of the cooking pan for the stirring of food. The slot 75 provides an opening in the event the handle of the pan interferes with the up and down movement of the overlay 72. As explained above, the overlays 72 and 77 are transparent so that the food may be observed for stirring, and the observation may be done without opening the cooking utensil to expose the area to smoke and splatter.

While the invention has been illustrated by reference to the particular device, there is no intent to limit the spirit or the scope of the invention to the precise details so set forth except as defined in the following claims.

I claim:

1. A cooking utensil cover comprising a housing arranged to cover the opening of a cooking pan and having an aperture communicating the interior of the housing with the cooking area of said pan, a filtered vent for said housing, there being an opening in one portion of said housing, a pair of transparent members arranged over said opening in superposed relation, a pin arranged on said housing pivotally supporting said transparent members, one of said transparent members having an elongated slit arranged to seat over said pin for pivotal movement and sliding movement of said member, a first of said members having an elongated slit therein, said first member having one side of the slit shorter than the other side, the other said member having a lateral slit arranged essentially perpendicularly to the slit in said first member, and said second member having a slit extension which is biased to said lateral slit.

2. A cooking utensil cover comprising a collapsible housing arranged to cover the opening of a cooking pan and having an aperture communicating the interior of the housing with the cooking area of said pan, a filter arranged in an upper portion of said housing, there being an opening in a side portion of said housing, a pair of transparent members arranged over said opening in superposed relation, a pin arranged on said housing pivotally supporting said transparent members, one of said transparent members having an elongated slit arranged to seat over said pin for sliding movement as well as pivotal movement, a first of said members having an elongated slit therein, said first member having one side of the slit shorter than the other side, the other said member having a lateral slit arranged essentially perpendicularly to the slit in said first member, and said second member having a slit extension which is biased to said lateral slit.

3. A cooking utensil cover comprising a collapsible sided housing arranged to cover the opening of a cooking pan and having an aperture communicating the interior of the housing with the cooking area of said pan, a filtered vent arranged in an upper portion of said housing, there being an opening in one side of said housing, a pair of transparent planar members arranged over said opening in superposed relation, a pin arranged on said housing pivotally supporting said transparent members, one of said transparent members having an elongated slit arranged to seat over said pin for pivotal movement and sliding movement of said member, a first of said members having an elongated upright slit extending from the lower portion thereof to a point generally centrally thereof, said first member having one side of the slit shorter than the other side, the other said member having a lateral slit arranged essentially perpendicularly to the slit in said first member, and said second member having a slit extension which is biased upwardly from said lateral slit.

4. A cooking utensil cover comprising a generally rectangular housing arranged to cover the opening of a cooking pan and having an aperture communicating the interior of the housing with the cooking area of said pan, a filtered vent arranged in an upper portion of said housing, at least one side of said housing being sloped, there being an opening in said sloped side, a pair of transparent members arranged over said opening in said sloped side in superposed relation, a pin arranged on said housing pivotally supporting said transparent members, one of said transparent members having an elongated slit arranged to seat over said pin for pivotal movement and sliding movement of said member, a first one of said members having an elongated slit therein, said first member having one side of the slit shorter than the other side, the other said member having a lateral slit arranged essentially perpendicularly to the slit in said first member, and said second member having a slit extension which is biased upwardly from said lateral slit.

References Cited in the file of this patent
UNITED STATES PATENTS

| | | |
|---|---|---|
| 2,078,814 | Schabacker et al. | Apr. 27, 1937 |
| 3,065,978 | Stephens | Nov. 27, 1962 |